United States Patent [19]

Hollandsworth et al.

[11] 4,341,468
[45] Jul. 27, 1982

[54] METHOD AND APPARATUS FOR DIAGNOSING VEHICLE WHEEL ALIGNMENT

[75] Inventors: William J. Hollandsworth, Town & Country; Dean O. Grubbs, Manchester, both of Mo.

[73] Assignee: Hunter Engineering Company, Bridgeton, Mo.

[21] Appl. No.: 23,403

[22] Filed: Mar. 23, 1979

[51] Int. Cl.³ .......................................... G01B 11/275
[52] U.S. Cl. ..................................... 356/155; 33/228
[58] Field of Search ............................ 356/154–155, 356/153; 33/203.18, 228, 286, 288

[56] References Cited

U.S. PATENT DOCUMENTS

| | | | |
|---|---|---|---|
| 2,601,262 | 6/1952 | Carrigan | 356/155 |
| 3,892,042 | 7/1975 | Senften | 356/155 |
| 4,095,902 | 6/1978 | Florer et al. | 356/155 |
| 4,097,157 | 6/1978 | Lill | 356/155 |
| 4,106,208 | 8/1978 | Hunter | 33/288 |
| 4,126,943 | 11/1978 | Senften | 356/155 |
| 4,150,897 | 4/1979 | Roberts, Jr. et al. | 356/155 |
| 4,239,389 | 12/1980 | Hollandsworth et al. | 356/155 |
| 4,265,537 | 5/1981 | Hunter | 356/155 |

*Primary Examiner*—William H. Punter
*Attorney, Agent, or Firm*—Gravely, Lieder & Woodruff

[57] ABSTRACT

The method for diagnosing vehicle wheel alignment characteristics in which the longitudinally spaced steerable and non-steerable wheels are equipped with means for permitting the practice of displaying the alignment characteristics of the planes of rotation of the steerable wheels in relation to the geometric center line and the thrust line effect of the non-steerable wheels on the steerable wheels, in combination with the steps of adjusting the plane of rotation of the non-steerable wheels for bringing the thrust line effect thereof into substantial tracking relation with the geometric center line of the vehicle, and monitoring the effect of the adjustment imparted to the non-steerable wheels.

5 Claims, 6 Drawing Figures

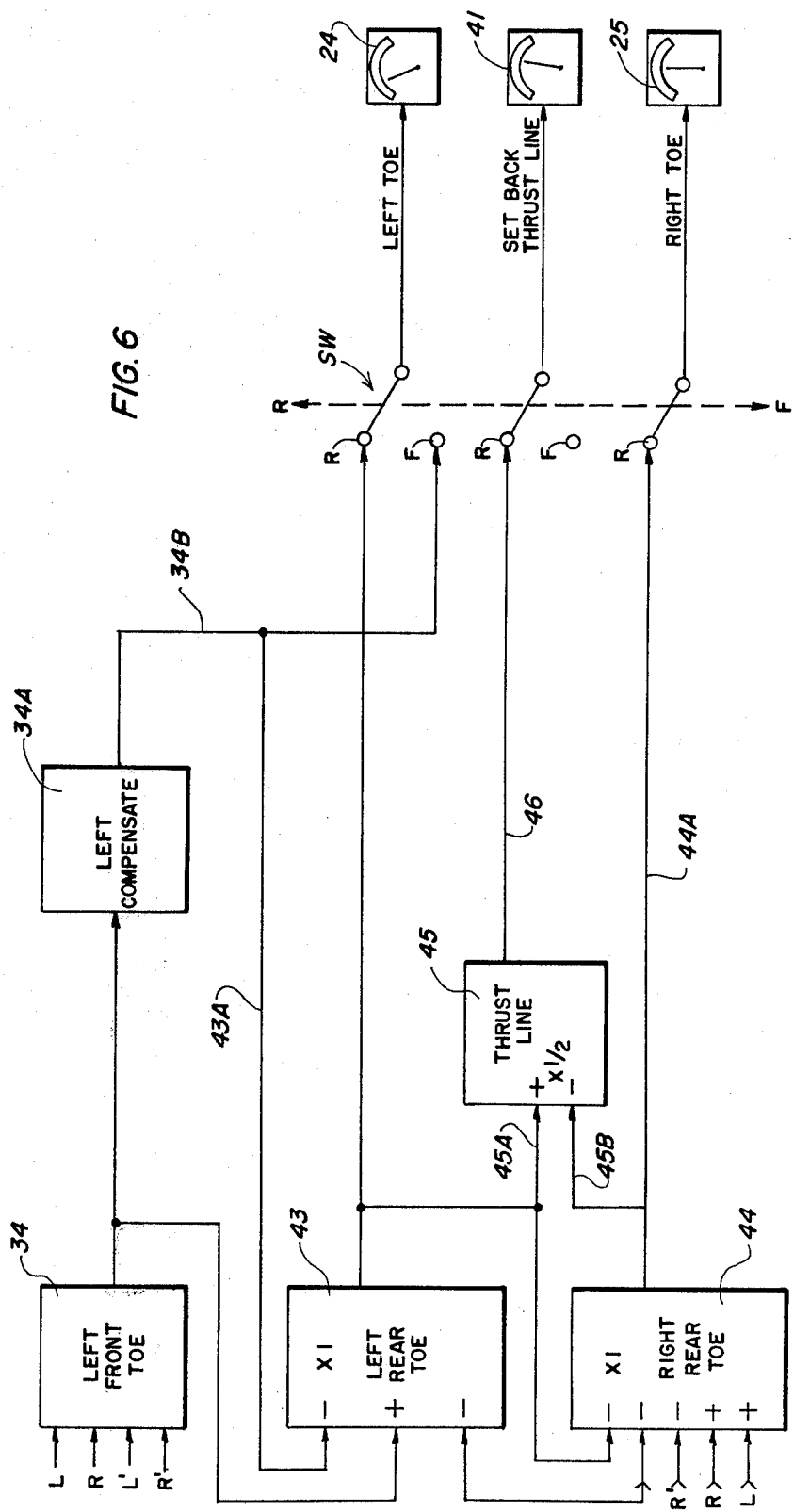

METHOD AND APPARATUS FOR DIAGNOSING VEHICLE WHEEL ALIGNMENT

BACKGROUND OF THE INVENTION

The ideal geometric configuration of a four wheel vehicle is a rectangle in which: the steerable wheels will run parallel with each other and are equidistant from the center of the connecting axle or its equivalent; in which the non-steerable wheels will run parallel with each other and are equidistant from the center of the connecting axle or its equivalent; in which the non-steerable wheels either track with the steerable wheels or are equally off set from the steerable wheel tracks; and in which the vehicle body has its longitudinal geometric center line coincident with the longitudinal center line for the steerable and non-steerable wheels.

The practical and economic considerations involved in the production of wheeled vehicles take into account the complications in connection with manufacturing tolerances present in the various parts and the possibility that tolerance mis-matching can build up variations from the ideal geometric configuration. As a consequence of the possible mis-matching of tolerances in the parts making up a finished vehicle provision is made for mechanically adjusting wheel positions relative to the chassis or body of a vehicle. In some vehicles all adjustments are found in the steerable wheel assemblies, while in others the adjustments are provided in both the steerable and non-steerable wheel assemblies. Generally vehicles are permitted to have some deviations from the ideal conditions of wheel alignment and wheel to body alignment. As long as the deviations are not regarded as serious the vehicle is put into use.

The many conditions attached to the original assembly of vehicles, and the equally many things that can occur to change wheel alignment on vehicles in use, make the design of apparatus to diagnose those conditions and changes very difficult. In the past apparatus has been provided that is capable of limited wheel alignment diagnosing ability. Some apparatus is simple to operate and some is very difficult and complicated, but in either type of apparatus there is little or no provision for obtaining a complete understanding of the interrelations of the steerable to non-steerable wheels, or of the relationship between wheels and vehicle body, or of the part that center point steering wheel position plays in relation to the other characteristics.

Examples of apparatus devised for examining vehicle wheel alignment characteristics include Carrigan U.S. Pat. No. 2,601,262 issued June 24, 1952, which is a light beam projection system incorporating passive light reflective mirrors on the steerable and non-steerable wheels and a chart spaced away from the vehicle to be in alignment with the light beam. Wheel alignment testing equipment involving placing it against machined surfaces on the wheels is shown in Holub U.S. Pat. No. 2,972,189 issued Feb. 21, 1961. This equipment is directed to the capability of locating and measuring mis-alignment in the frame and front and rear housings of a vehicle, as well as checking wheel tracking, all with line of sight telescopes and mechanical components. A somewhat similar vehicle wheel alignment device has been disclosed in MacMillan U.S. Pat. No. 3,091,862 issued June 4, 1963, but this is limited to use of sighting tubes and portable targets.

More sophisticated apparatus for indicating wheel alignment characteristics has been shown in Manlove U.S. Pat. No. 3,164,910 issued Jan. 12, 1965 and U.S. Pat. No. 3,181,248 issued May 4, 1965 respectively. In these arrangements mechanical pointers are caused to move over scales for checking alignment characteristics. The use of light beam projecting means for wheel alignment checking is disclosed by Holub U.S. Pat. No. 3,337,961 issued Aug. 27, 1967. However, the projectors illuminate scales at different times and so avoid simultaneous operation. Another system for using light beams in association with steerable wheels has been disclosed by Senften U.S. Pat. No. 3,782,831 issued Jan. 1, 1974 in apparatus for determining the angular position between a fixed and a movable body, such as the position of the steerable wheels relative to the axle. Electronic scanning devices butted against the vehicle steerable and non-steerable wheels has been disclosed by Hirmann U.S. Pat. No. 3,855,709 issued Dec. 24, 1974 wherein the scanning devices measure chassis geometry from the wheel position.

Alignment equipment limited to front wheel toe is shown in Butler U.S. Pat. No. 3,865,492 issued Feb. 11, 1975. This type of equipment has severe limitation as to what information can be obtained about the alignment characteristics of vehicle wheels and body. The prior art includes the electronic run-out compensation means of Senften U.S. Pat. No. 3,892,042 issued July 1, 1975 which is concerned with getting wheel alignment checking means properly oriented with the plane of wheel rotation. More recently, electronic alignment apparatus for indicating front wheel toe has been disclosed by Rishoud, et al U.S. Pat. No. 3,963,352 issued June 15, 1976, or by Florer et al in U.S. Pat. No. 4,095,902 issued June 20, 1978, or by Lill in U.S. Pat. No. 4,097,157 issued June 27, 1978.

The most recent apparatus is shown in Hunter patent application, Ser. No. 942,302, filed Sept. 14, 1978, wherein apparatus is provided which has the ability to diagnose alignment characteristics. The application of Hollandsworth and Grubbs, Ser. No. 967,072, filed Dec. 6, 1978, now U.S. Pat. No. 4,239,389 issued Dec. 16, 1980, is directed to the electronics involved in alignment apparatus of the type disclosed in the Hunter application.

BRIEF DESCRIPTION OF THE INVENTION

This invention is concerned with apparatus for use in diagnosing vehicle wheel alignment problems, and is particularly directed to the method for diagnosing vehicle wheel alignment characteristics.

The important object of this invention is to provide a method for diagnosing vehicle wheel alignment conditions by the steps of fixing the angular position of the steerable wheels to provide a basis for determining if the non-steerable wheels are aligned as desired with respect to the geometric center line of the vehicle.

An equally important object is to provide simple mechanical and electrical means in an organization with displays so wheel alignment problems can be diagnosed by application of the foregoing method.

A further object is to provide electronic diagnostic means in association with active and passive sensors mounted on the vehicle wheels, such that a given angular position of one set of wheels can be relied upon for diagnosing alignment characteristics of the other set of wheels in preparation for effecting adjustments of the latter wheels.

Still a further important object of the present invention is directed to diagnosing vehicle wheel alignment in which the steerable and non-steerable wheels are longitudinally spaced by means for displaying the alignment characteristics of the planes of rotation of the steerable wheels in relation to the geometric center line and thrust line effect thereon of the non-steerable wheels, and means for monitoring the effect of adjustments to the non-steerable wheels when it is found necessary to bring the plane of rotation of the non-steerable wheels into substantial tracking relation with the geometric center line of the vehicle.

Further objects of the present invention are to simplify the construction of the essential apparatus, to increase the accuracy of results in the use of the apparatus, to devise apparatus that may be used with a variety of wheel mounting arrangements, and to be able to check out the critical wheel alignment parameters quickly, accurately and with instruments having unique characteristics.

BRIEF DESCRIPTION OF THE DRAWINGS

The present invention is illustrated in certain embodiments set forth in the accompanying drawings, wherein:

FIG. 6 is a block diagram of an alternate circuit to that disclosed in FIG. 5.

DETAILED DESCRIPTION OF THE INVENTION

Figure 1:
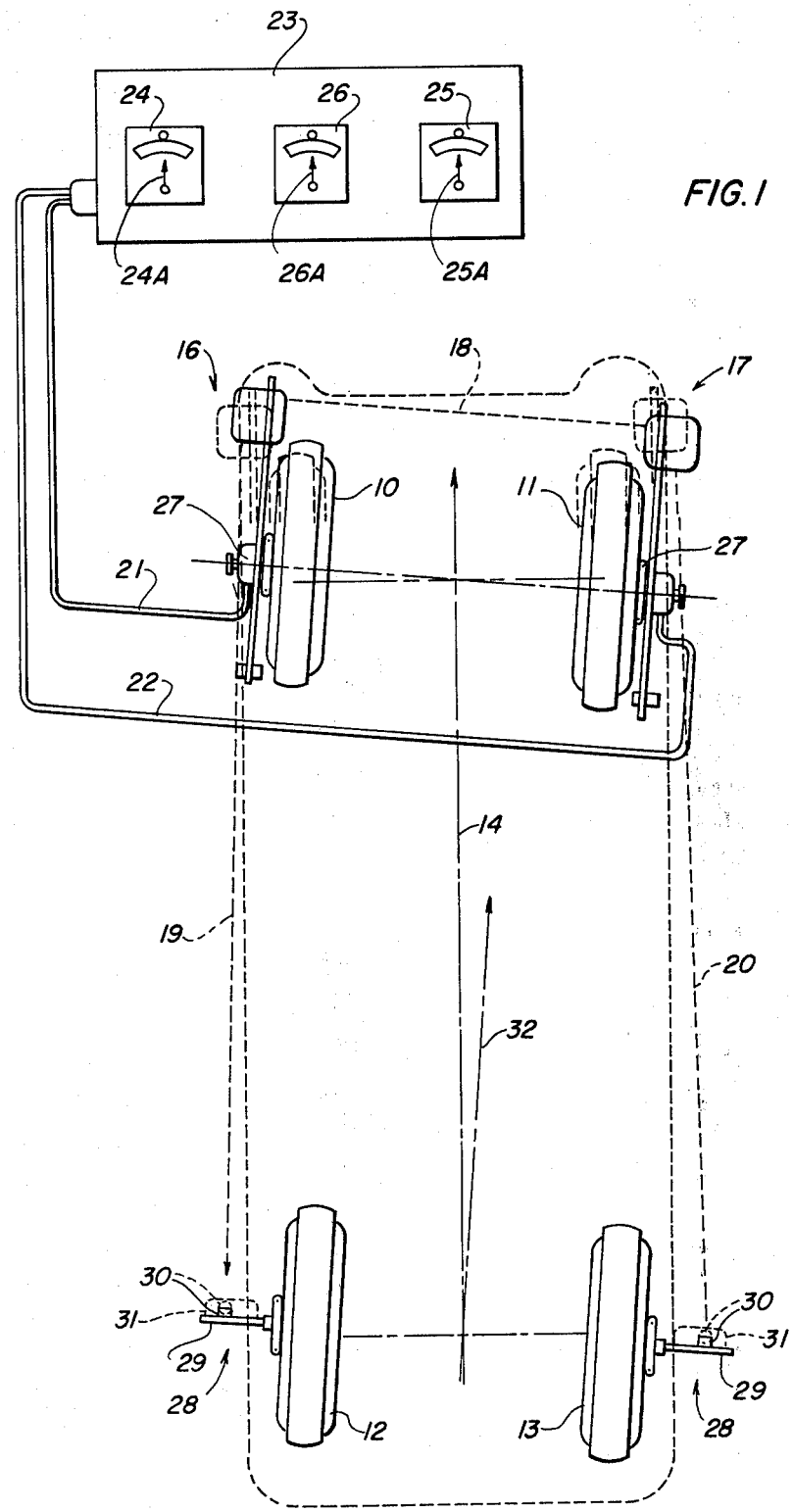
FIG. 1 is a schematic plan view of a vehicle wheel layout of steerable and non-steerable wheels equipped with diagnostic instruments and a console for housing electronic components and alignment displays.
Figure 2:
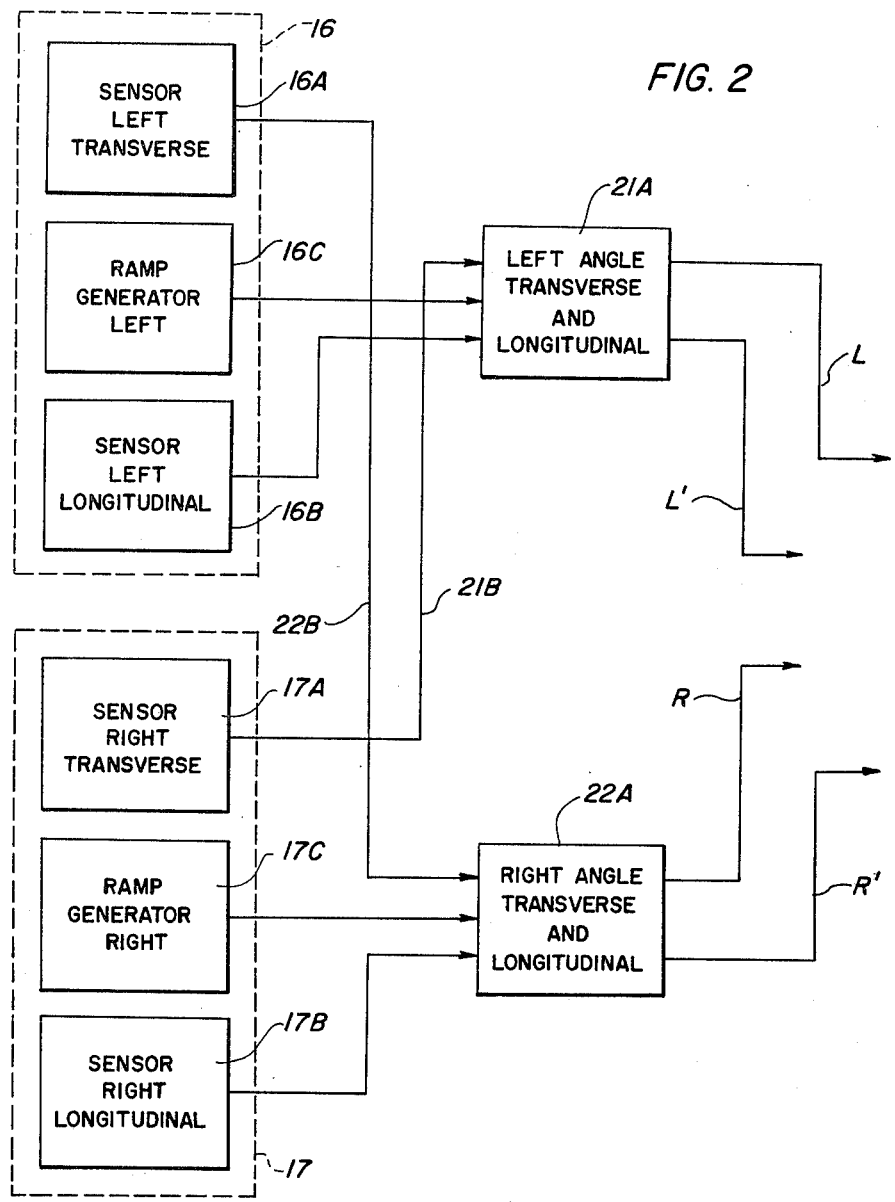
FIG. 2 is a block diagram of the components in the sensor instruments carried by the steerable wheels of a vehicle.
Figure 3:
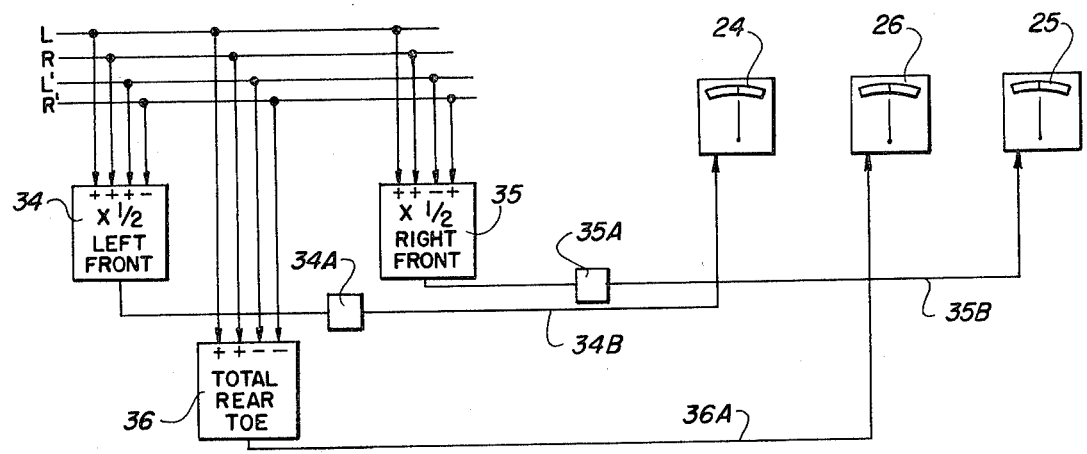
FIG. 3 is a block diagram of a form of electronic circuit arrangement useful in the practice of this invention.

A presently preferred arrangement of apparatus is shown schematically in FIG. 1, and the associated electronic provisions are seen in the block diagrams of FIGS. 2 and 3. In these views, the vehicle wheel arrangement has steerable left and right wheels 10 and 11 respectively, and non-steerable left and right wheels 12 and 13 respectively. These wheels ideally should be mounted on the vehicle chassis or frame so the non-steerable wheels have the thrust line parallel to the geometric center line 14. In actuality the ideal conditions of alignment are never quite obtained in the original construction of the vehicle, and after a period of use the wheel alignment can deviate more from the ideal because of hard usage or by reason of accidents or dropping a wheel into a chuck hole.

The steerable wheels 10 and 11 are each equipped with active sensor means 16 and 17 respectively. Each sensor is operable to project radiant energy beams transversely as indicated by the broken line 18, and to project longitudinal radiant energy beams indicated by the respective broken lines 19 and 20. The projected beams 18 and 19 and 20 are sensed by sensors in the means 16 and 17, and by suitable cables 21 and 22 the signals are transmitted into electronic circuits disposed in a suitable console 23. The circuits are connected to displays in which the display 24 visualizes the alignment of the left steerable wheel 16, the display 25 visualizes the alignment of the right steerable wheel and the display 26 visualizes the total alignment conditions of the non-steerable wheels 12 and 13.

The active sensors 16 and 17 are mounted on the respective steerable wheels 10 and 11 by adapters 27 which are adjustable to compensate for wheel run-out, all as described in the prior patent of Senften U.S. Pat. No. 3,891,042, granted July 1, 1975. By these adapters the sensors 16 and 17 can be properly related to the plane of rotation of the wheel on which each is mounted. In cooperation with active sensors 16 and 17, the non-steerable wheels are provided with passive units 28 which support reflective means in predetermined relation to the plane of rotation of the wheels 12 and 13. Each passive unit 28 is constructed in accordance with the disclosure thereof in the copending application of Hunter, Ser. No. 942,302, filed Sept. 14, 1978. These units embody flat mirrors 29 set to be perpendicular to the plane of wheel rotation, and retro reflectors 30 mounted on mirror blanking shields 31 so as to be quickly moved between inoperative positions exposing the mirrors and operative positions blanking out the mirrors.

The practical operation of the apparatus seen in FIG. 1 is put to use with the circuit arrangement seen in FIGS. 2 and 3. It is understood that each sensor 16 and 17 develops two signals, one by means 16A and 17A for the transverse or cross-looking beam, and one by means 16B and 17B for the longitudinal beam. These signals are brought into the console electronics by cables 21 and 22 (See FIG. 1). The cable 21 contains leads which transmit from means 16A, 16B and 16C the transverse beam signal and the longitudinal beam signal. In like manner, the cable 22 contains leads which transmit from means 17A, 17B and 17C transverse and longitudinal signals. The construction of the sensors 16 and 17 is shown in the prior patent of Senften U.S. Pat. No. 4,126,943, issued Nov. 28, 1978, and that construction is incorporated here by reference.

When the sensors 16 and 17 are activated from the console 23, beams 18, 19 and 20 are generated, and these beams are scanned by photosensitive means 16A, 16B and 17A and 17B in the sensors. The sensor signals are the analogs of the ramp voltages generated by means 16C and 17C at the instant of beam activation of the sensors for one direction of response of the ramp generators which are potentiometers. As seen in FIG. 2, the leads 21 and 22 are connected into left and right transverse and longitudinal angle computers 21A and 22A respectively with suitable cross-over leads 21B and 22B from the opposite sensor. The computers develop signals in leads L, L', R and R'. If the retro reflectors 30 are in position so the shields 31 blank the mirrors 29, the signals from the sensors 16 and 17 are analogs of the left and right toe for the steerable wheels 10 and 11 relative to the geometric center line 14. When the shields 31 are moved to expose the mirrors, the signals from sensors 16 and 17 are analogs of the left and right toe for the steerable wheels 10 and 11 relative to the thrust line developed by the non-steerable wheels 12 and 13, and represented by the arrow 32.

Turning now to FIG. 3 the sensor signals are shown transmitted on leads L, R, L' and R'. The signals are connected into sub-circuit amplifier 34 for the left steerable wheel 10, into sub-circuit amplifier 35 for the right steerable wheel 11, and into sub-circuit amplifier 36 for the total rear toe developed from the alignment of the non-steerable wheels 12 and 13. These signals are processed in the indicated polarity and scaled with the indicated multiplier. The output from the amplifier 34 is connected through compensation circuit 34A so as to be visualized at the left display 24. In like manner, the output from the amplifier 35 is connected through compensation circuit 35A and is visualized at the right display 25. The output from the amplifier 36 is connected to display 26 where the total alignment of the non-steerable wheels 12 and 13 is visualized.

Returning to FIG. 1, there is depicted a vehicle wheel alignment in need of correction since the non-steerable wheels 12 and 13 produce a thrust line along the direction represented by arrow 32, and the steerable wheels 10 and 11 are directed to the right relative to the geometric center line represented by the line 14. In order to discover the alignment problems and be able to make adjustments to align the steerable and non-steerable wheels relative to the geometric center line 14, certain procedures need to be followed.

The procedures to be described are given by way of example and with the understanding that they will illustrate methods of using the present apparatus. With the circuit arrangement seen in FIG. 3 it is possible to eliminate the electronic memory circuit provisions seen in the copending application of Hollandsworth and Grubbs, Ser. No. 967,072, filed Dec. 6, 1978, now U.S. Pat. No. 4,239,389 issued Dec. 16, 1980, or similar memory circuits proposed by others. Now the present apparatus employs the positioning of a steerable wheel in a known set attitude with respect to the geometric center line by appropriate presentation of the passive units 28 at the non-steerable wheels 12 and 13. The procedure is practiced by mounting the active sensors 16 and 17 on steerable wheels 10 and 11, and passive sensors 28 on the non-steerable wheels 12 and 13. The passive sensors 28 are set with the retro reflectors 30 operative and the mirrors 29 blanked out by shields 31. In this setting, the mechanic turns the steering wheel (not shown) until the left steerable wheel 10 is positioned with the left display pointer 24A at substantially zero. The display 24 monitors the wheel motion because the beam projected longitudinally is reflected by the retro reflectors 30 which establish a geometric center line based upon wheels location. This operation positions the left steerable wheel substantially parallel with the geometric center line 14 (FIG. 1), and it is left in that angular position. The mechanic next moves the retro reflectors 30 out of the way so the mirrors 29 of the passive units 28 are exposed to the longitudinal beams 19 and 20. Display 24 is observed because it will now respond to show the non-steerable wheels thrust line effect on the left steerable wheel 10. That thrust line will be as indicated at line 32, and is due to the toe angle of the non-steerable wheels relative to the geometric center line 14.

The next step the mechanic takes is to mentally remember or by notation write down the reading on display 24 and whether it is to the left or right of the initially displayed zero position of pointer 24A. It is also feasible to equip the displays with settable pointers to assist memory. This responsive movement at display 24 is the amount and direction of the thrust line for the wheel 12, and an essentially equal amount and opposite direction is present in the companion wheel 13. At the same time, the mechanic observes display 26 which is the total non-steerable wheel toe. The reading at display 26 is compared with the specification for the vehicle being examined. Since the non-steerable wheels 12 and 13 are generally movable together, the correction to be made at the individual wheels 12 and 13 is one-half the amount observed at display 26. For example, if the amount at display 26 registers in the out direction and the vehicle specification calls for "zero" toe, the reading at display 26 is divided by two and the non-steerable wheels need to be adjusted to the one-half value per wheel 12 and 13, but in the opposite direction indicated by display 26. However, it is necessary to combine the previous notation of readings at display 24 with the reading at display 26. The combining is done algebraically by adding directions if both read "in" and subtracting directions if they are opposite, one being "in" and the other being "out". It is possible to have a non-steerable wheel alignment condition where one of the wheels needs to be corrected more than the other, and the movement is opposite.

In making the non-steerable wheel adjustments, the mechanic may begin with the left non-steerable wheel 12 and needs to watch display 26 so it moves the determined amount and in the proper direction. The same observation is made as the mechanic adjusts the right non-steerable wheel 13, but now the amount and direction of movement of the display 26, is made from the position of the pointer 26A at the conclusion of the adjustment of the left or opposite non-steerable wheel.

An alternate method employs the positioning of a steerable wheel, as wheel 10 for example, in a known set attitude with respect to the thrust line by appropriate use or presentation of the passive units 28 at the non-steerable wheels 12 and 13. All sensors carried by the wheels 10 and 11 are mounted as above disclosed, but sensor units 28 are first presented or set with the mirrors exposed. In this setting, the mechanic brings are left steerable wheel 10 into a positioned with the display pointer 24A at substantially zero. The display 24 monitors the motion of the rotational plane of wheel 10 relative to the thrust line of the non-steerable wheels. This operation positions the left steerable wheel substantially parallel with the thrust line 32 (FIG. 1) and it is left in that position. The mechanic observes display 26 which is the total toe of the non-steerable wheels 12 and 13. The reading at display 26 is compared with the specification for the vehicle being examined, and one-half of the difference is remembered or written down for later combination to calculate rear alignment condition. With left steerable wheel 10 retained at its prior set position, the mechanic next covers mirrors 29 and exposes retro reflectors 30 of the passive sensors 28. Display 24 is observed as its response now indicates the non-steerable wheels thrust line effect. That thrust line will have some finite direction, such as indicated at line 32, and is due to the toe angles and directions of rolling movement of the non-steerable wheels relative to the geometric center line 14. The observed thrust line amount and one-half of the remembered total toe variance from specifications are combined as described in the previous procedure.

If non-steerable wheel adjustments are to be made, according to foregoing method, the mechanic continues with utilization of steerable wheel 10 as an adjustment aid, and relies upon the display pre-setting. The mechanic, having combined prior measurement results, now exposes mirrors 29 to re-establish displays 24 and 25 with respect to non-steerable wheels thrust line. In this setting, the mechanic turns the steering wheel (not shown) until the left steerable wheel 10 is positioned with the left display pointer 24A at substantially one-half the calculated left non-steerable wheel adjustment required. This operation positions the left steerable wheel as a reference line as the left non-steerable wheel is appropriately adjusted. The mechanic proceeds to correct the left non-steerable wheel plane of rotation until display pointer 24A substantially returns to zero. Non-steerable wheels alignment is then completed by correcting the right non-steerable wheel, with mirrors 29 still exposed, until total non-steerable wheel total toe angle observed on display 26 moves to the desired or specified value.

The result of these step by step manipulations is that the non-steerable wheels 12 and 13 are brought into proper relation to the geometric center line 14 of the vehicle. The practice of these procedures is primarily to enable a mechanic to determine the alignment of the non-steerable wheels of a vehicle, and to correct the same if it is possible to do so. If such wheels are not adjustable, then these procedures will at least allow the mechanic to find the thrust line of the non-steerable wheels and then adjust the positions of the steerable wheels 10 and 11 to compensate for that condition when the thrust line does not match the geometric center line. If these two lines are not badly out of coincidence or matching relation, the adjustment of the steerable wheels is deemed to be satisfactory for that vehicle.

Figure 4:
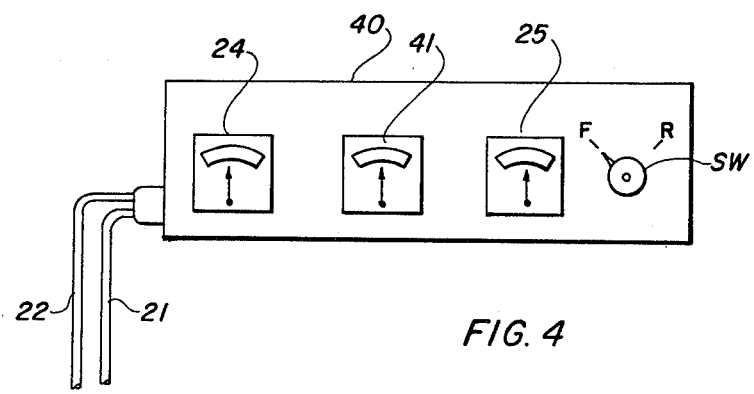
FIG. 4 is a fragmentary view of a modified console useful in practicing a modification of the invention.
Figure 5:
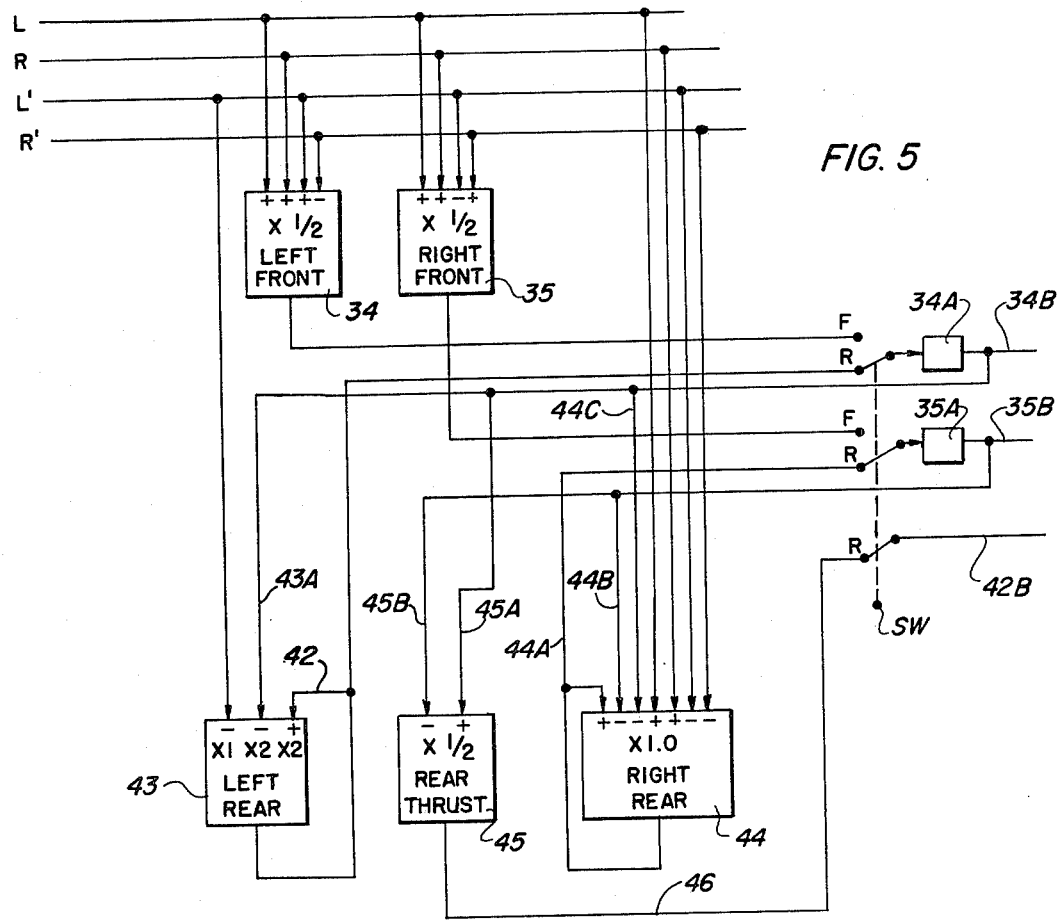
FIG. 5 is a block diagram of a modified electronic circuit arrangement which is related with the console of FIG. 4.

A modified procedure for determining vehicle wheel alignment problems may be practiced by using modified circuit and console apparatus. In this modification, the console 23 and its circuitry of FIG. 3 is changed to a console 40 (FIG. 4) housing the electronics seen in the block diagram of FIGS. 2 and 5, and including a selector switch SW accessible on the console panel along with displays 24 and 25, as in FIG. 1, but now having a display 41 which develops a different function from that for display 26. The displays 24 and 25 in console 40 are connected to the amplifier unit 34 and 35 when the switch SW is moved to the position F (FIGS. 4 and 5). The signal information supplied to these amplifiers 34 and 35 through leads L, R, L' and R' is the same as described with reference to FIGS. 2 and 3. Thus, in the setting of switch SW to select all contacts F, the left and right steerable wheel displays 24 and 25 are activated.

When switch SW (see FIG. 5) is moved to the contact positions indicated at R, a different set of wheel alignment parameters is presented at the console 40 for visual observation at displays 24 and 25. Now information about the left non-steerable wheel 12 is developed in the amplifier 43 by signal from the sensor 16B in the sensor 16 and through a branch lead from lead L', by feed back by lead 43A from the wheel run-out compensation circuit means 34A, and by a second feed back at lead 42. The information about the right non-steerable wheel 13 is developed at amplifier 44 and its output 44A is connected through switch SW to the run-out compensation circuit means 35A and feed back is obtained by lead 44B from compensator 35A and by feed back through lead 44C from run-out compensator 35A. In addition the amplifier 44 obtains alignment status signals from leads L, R, L' and R' as shown, and a feed back at lead 42A. In addition, alignment information concerning non-steerable wheel thrust is developed at amplifier 45 through the lead 45A from run-out compensator 34A and through lead 45B from run-out compensator 35A. The output of amplifier 45 is conducted by lead 46 and switch SW to lead 42B and is visualized at display 41.

As shown, the signals fed into each amplifier 34, 35, 43, 44 and 45 have the indicated polarity and are scaled by appropriate multipliers, with proper run-out compensation at circuit means 34A and 35A.

An alternate arrangement of electronics circuitry is seen in the block diagram of FIG. 6. As compared to the circuit of FIG. 5, the FIG. 6 circuit assumes unlimited access to needed signals to instrument individual non-steerable toe measurement and display. When switch SW is moved to the contact positions R, information about the left non-steerable wheel 12 is developed in the amplifier 43 by signal from the sensor 16B in the sensor 16 and by feed back by lead 43A from the compensation means 34A. The amplifier 44 obtains alignment status signals from leads L, R, L' and R' as shown. The information about the right non-steerable wheel 13 is developed at amplifier 44 and its output 44A is connected through switch SW to display 25. In addition, alignment information concerning non-steerable wheel thrust is developed at amplifier 45 through the lead 45A from amplifier 43 and through lead 45B from amplifier 44. The output of amplifier 45 is conducted by lead 46 and switch SW, and is visualized at display 41. As shown, the signals fed into each amplifier 43, 44, and 45 have the indicated polarity and are scaled by the multiplier.

With the modified apparatus as set forth above, a mechanic is able to determine alignment conditions for vehicle wheels in the following manner. It is first necessary to position the switch SW at the contact position F (FIG. 4) and to expose the retro reflectors 30 to the longitudinal beams 19 and 20. Next the mechanic turns the vehicle left steerable wheel 10 into a position such that the zero position is visualized on the display 24. This wheel 10 remains in that position. The foregoing steps are followed by the steps of exposing the mirrors 29 at units 28 and moving switch SW to the contact position R. This causes the displays 24 and 25 to move to indicate the respective left and right non-steerable wheel toe relation to the geometric center line 14. If these wheels deviate from the desired toe alignment, the mechanic is able to adjust each wheel and observe the change at the displays 24 and 25 until the desired toe is displayed. It is, of course, understood that non-steerable wheel adjustment is not possible unless provision is made for that purpose. If the wheel toe visualized at displays 24 and 25 is not dangerously out of a desired range, it will be possible for the mechanic to adjust the alignment of the steerable wheels 10 and 11 so as to take into account the toe alignment condition determined by application of the above modified apparatus.

SUMMARY

The foregoing disclosure is directed to a unique way of diagnosing vehicle wheel alignment by utilizing a given position of one of the steerable wheels to establish a basis in the electronic circuits for determining certain relationships of the wheels to each other and to the relationship with the geometric center line for the vehicle. For example, the unique method embodies displaying the alignment characteristics of the planes of rotation of the steerable wheels in relation to the geometric center line and thrust line effect on the steerable wheels of the non-steerable wheels so that a mechanic can be guided in adjusting the non-steerable wheels to a desired alignment position by observing the effect of such adjustments as they are made. The means herein disclosed is able to display the alignment characteristics of the plane of rotation of the steerable wheels in respect of the geometric center line, and with respect to the effect of the thrust line of the non-steerable wheels on the steerable wheels in a desired sequence.

It has been pointed out that the apparatus will enable a mechanic to perform alignment diagnosing, after mounting the sensors and reflective means on the respective wheels, by placing one of the steerable wheels in a set position where the plane of rotation of that wheel is substantially parallel to the geometric center line. This is done by observing the appropriate display until it is zeroed. Thereafter that wheel is left in the zero position during the remainder of the diagnosis and adjustments. This procedure is made possible by the provision of reflective means such as retro reflectors which establish location of the non-steerable wheels with respect to the steerable wheels, and such as mirrors which establish alignment information about the respective wheels.

The scope of the present disclosure is set forth in the above specification which includes variations now known, and which may suggest other variations of utility.

What is claimed is:

1. A method for diagnosing vehicle wheel alignment in which the vehicle has steerable and non-steerable wheels longitudinally spaced and at either side of the geometric axis, said method comprising: mounting alignment diagnosing instruments on the steerable and non-steerable wheels and compensating the instruments for wheel run-out; moving the steerable wheels such that one thereof has its plane of rotation aligned, initially independent of the existing alignment positions of the non-steerable wheels, in a position selected to be substantially parallel with the vehicle geometric axis; visually displaying the attainment of said selected position for said one steerable wheel; thereafter displaying the total toe alignment characteristics of the planes of rotation of the non-steerable wheels relative to the geometric axis of the vehicle; adjusting the position of the non-steerable wheels to bring the total toe alignment thereof into substantial tracking relation with the geometric axis of the vehicle; and using the total toe alignment display for monitoring the effect of the adjustment to the non-steerable wheels.

2. A method for diagnosing vehicle wheel alignment in which the vehicle has steerable and non-steerable wheels longitudinally spaced and at either side of the geometric axis, said method comprising:
   (a) providing each of the non-steerable wheels with first and second radiant energy beam sensing reflectors;
   (b) providing each of the steerable wheels with signal generating sensors and with projectors of radiant energy beams directed substantially longitudinally toward the reflectors on the non-steerable wheels and transversely of the vehicle toward the sensors on the opposite steerable wheels, said beams originating from positions having a known relationship with the steerable wheel planes of rotation and said signal sensors being responsive to the radiant energy beams projected toward and returned from the selected ones of non-steerable wheel beam sensing reflectors and from the opposite steerable wheel projector;
   (c) providing separate signal displays responsive to signals from each of the steerable wheel signal sensors;
   (d) positioning the steerable wheels into positions where one thereof is in a position in which its associated signal display reaches a substantially zero reading independently of the existing alignment position of the non-steerable wheel on the same side of the vehicle with the one steerable wheel that is steered to obtain the substantially zero display reading; and
   (e) checking the alignment of the non-steerable wheels subsequent to the initial use of the signal displays by using the signal display values for calculating the need for adjusting the positions of the non-steerable wheels.

3. The method of claim 2, wherein the use of the signal display values is applied to calculating the direction needed for adjusting the position of the non-steerable wheels to bring the thrust line effect thereof into substantial tracking relation with the known position of the selected one of the steerable wheel.

4. The method set forth in claim 2, wherein the diagnosing is initiated with the use of the second radiant energy beam sensing reflectors to generate signals from the steerable wheel signal sensors for positioning the one of the steerable wheels with its plane of rotation substantially parallel with the thrust line of the non-steerable wheels.

5. A method for diagnosing vehicle wheel alignment in which the vehicle has steerable and non-steerable wheels longitudinally spaced and at either side of the vehicle, the method comprising:
   (a) providing each of the non-steerable wheels with first and second radiant energy beam reflectors;
   (b) providing each of the steerable wheels with radiant energy beam projectors for directing the beams longitudinally toward the non-steerable wheel reflectors and transversely toward the opposite steerable wheel, and with sensors responsive to the radiant energy beams projected thereto and returned from the reflectors;
   (c) locating the beam projectors and sensors on the steerable wheels in a known position relative to the plane of rotation of the steerable wheel;
   (d) providing signal displays responsive to the signal generating sensors for receiving and displaying the signals from the sensors in terms of wheel positions;
   (e) employing first ones of the radiant energy beam reflectors on the non-steerable wheels for reflecting projected radiant energy beams toward the sensors at the steerable wheels;
   (f) monitoring the movement of the steerable wheels into positions causing a zero response at one of the displays for relating the plane of rotation of that steerable wheel to the geometric axis of the vehicle;
   (g) thereafter employing a second one of the radiant energy beam reflectors on the non-steerable wheels for reflecting projected radiant energy beams toward the sensors at the steerable wheels;
   (h) monitoring the movement of the steerable wheels into positions causing a zero response at one of the displays for relating that steerable wheel to the thrust line effect of the non-steerable wheels upon the steerable wheels; and
   (i) selectively using the values of the generated signals monitored at the displays to establish positional relationship as between certain of the wheels and the vehicle.

* * * * *